US008571936B2

(12) United States Patent
Geer, III et al.

(10) Patent No.: US 8,571,936 B2
(45) Date of Patent: *Oct. 29, 2013

(54) DYNAMIC INTEGRATION AND NON-LINEAR PRESENTATION OF ADVERTISING CONTENT AND MEDIA CONTENT

(75) Inventors: Walter Geer, III, Bronx, NY (US); Ellen To, New York, NY (US); Suzanne McDonnell, New York, NY (US); Adam Solomon, East Setauket, NY (US); Mark Fortner, New York, NY (US); Jason Witt, South Orange, NJ (US)

(73) Assignee: Viacom International Inc., New York, NY (US)

( * ) Notice: Subject to any disclaimer, the term of this patent is extended or adjusted under 35 U.S.C. 154(b) by 416 days.

This patent is subject to a terminal disclaimer.

(21) Appl. No.: 12/794,347

(22) Filed: Jun. 4, 2010
(Under 37 CFR 1.47)

(65) Prior Publication Data
US 2011/0112915 A1 May 12, 2011

Related U.S. Application Data

(60) Provisional application No. 61/184,274, filed on Jun. 4, 2009.

(51) Int. Cl.
G06Q 30/00 (2012.01)
G06F 13/00 (2006.01)
H04N 7/10 (2006.01)

(52) U.S. Cl.
USPC ............... 705/14.61; 705/14.73; 705/14.12; 705/14.49; 725/42

(58) Field of Classification Search
USPC ............................ 705/14.12, 14.49; 725/42
See application file for complete search history.

(56) References Cited

U.S. PATENT DOCUMENTS

| 6,912,504 | B1 | 6/2005 | Rashkovskiy | 705/14 |
| 7,054,831 | B2 | 5/2006 | Koenig | 705/14 |
| 7,263,714 | B2 | 8/2007 | Lowthert et al. | 725/139 |
| 8,196,166 | B2 | 6/2012 | Roberts et al. | |
| 2001/0056370 | A1 | 12/2001 | Tafla | 705/14 |
| 2004/0015608 | A1 | 1/2004 | Ellis et al. | 709/246 |

(Continued)

OTHER PUBLICATIONS

Office Action from co-pending U.S. Appl. No. 12/794,337, dated Aug. 17, 2012, 28 pages.

Primary Examiner — John G Weiss
Assistant Examiner — Marilyn G Macasiano
(74) Attorney, Agent, or Firm — Fay Kaplun & Marcin, LLP

(57) ABSTRACT

Described are methods and apparatuses, including computer program products, for dynamic integration and non-linear presentation of advertising content and media content. The method includes receiving a request for media content; combining the requested media content and advertising content to provide an interactive advertising unit; and transmitting the interactive advertising unit for presentation on the remote computing device, wherein the advertising content and media content are presented concurrently. The interactive advertising unit includes a first content layer including the requested media content and a media player, a second content layer including the advertising content, and an integration module for coordinating interaction between the layers. Coordinating interaction between the layers includes: managing the spatial presentation of the requested media content and the advertising content, synchronizing the temporal presentation of the requested media content and the advertising content, and controlling the presentation priority of the requested media content and the advertising content.

16 Claims, 10 Drawing Sheets

(56) References Cited

U.S. PATENT DOCUMENTS

| | | | |
|---|---|---|---|
| 2004/0116183 A1 | 6/2004 | Prindle | 463/42 |
| 2004/0186771 A1 | 9/2004 | Squires | 705/14 |
| 2005/0267813 A1 | 12/2005 | Monday | 705/26 |
| 2006/0143675 A1 | 6/2006 | Willis et al. | 725/114 |
| 2006/0242016 A1 | 10/2006 | Chenard | 705/14 |
| 2007/0072676 A1 | 3/2007 | Baluja | 463/42 |
| 2007/0112630 A1 | 5/2007 | Lau et al. | 705/14 |
| 2007/0214049 A1* | 9/2007 | Postrel | 705/14 |
| 2007/0260677 A1 | 11/2007 | DeMarco et al. | 709/203 |
| 2008/0021775 A1 | 1/2008 | Lerman et al. | 705/14 |
| 2008/0066107 A1* | 3/2008 | Moonka et al. | 725/42 |
| 2008/0077952 A1 | 3/2008 | St. Jean et al. | 725/32 |
| 2008/0097915 A1 | 4/2008 | Golan et al. | 705/51 |
| 2008/0194332 A1 | 8/2008 | Kadikario et al. | 463/42 |
| 2008/0320512 A1 | 12/2008 | Knight | 725/32 |
| 2009/0024482 A1 | 1/2009 | Synstelien et al. | 705/14 |
| 2009/0063280 A1* | 3/2009 | Wurster et al. | 705/14 |
| 2009/0094525 A1 | 4/2009 | Coelius et al. | 715/741 |
| 2009/0265367 A1 | 10/2009 | Corbett | 707/102 |
| 2010/0153990 A1 | 6/2010 | Ress et al. | |
| 2011/0067115 A1 | 3/2011 | Cappio et al. | |

* cited by examiner

DYNAMIC INTEGRATION AND NON-LINEAR PRESENTATION OF ADVERTISING CONTENT AND MEDIA CONTENT

RELATED APPLICATION

This application claims priority to Ser. No. 61/184,274, filed on Jun. 4, 2009, the entire disclosure of which is incorporated herein by reference.

TECHNICAL FIELD

The subject matter of this application relates generally to methods and apparatuses, including computer program products, for dynamic integration and non-linear presentation of advertising content and media content.

BACKGROUND

Content providers have long sought to include advertising as part of their broadcasts in order to generate revenue and recoup the costs of content production, and manufacturers of consumer goods have placed their ads with various content providers in order to extol the virtues of their goods to the largest possible consumer audience. For example, ever since their earliest days, radio and television stations have frequently broadcast blocks of ads in between their programming. More recently, content providers on the Internet have utilized banner advertisements, pop-up advertisements, and other forms of interactive advertising on websites.

In order to capitalize on the recent explosion in availability of online media (e.g., streaming video feeds), content providers, consumer goods companies, and advertising firms have turned their attention to developing dynamic and interactive experiences for users who access the online media.

SUMMARY

Therefore, it would be desirable to have a method and system for dynamic integration and non-linear presentation of advertising content with media content (e.g., digital media content) to achieve the effect of linking the advertisement with the context of the digital media content, web page, and/or the embedded media player, thereby increasing the advertisement's exposure to the consumer. Also, it would be desirable to present the advertising content and the digital media content in a non-linear fashion so to leave the digital media content uninterrupted and substantially unobstructed while at the same time displaying the advertising content to the user, allowing the user to enjoy the desired media content while simultaneously viewing the advertising content. In addition, it would be desirable to allow the user to interact with the advertising content and/or tie the media content and the advertising content together in a unique and unanticipated way.

In general overview, the techniques described herein are related to integration of a fully interactive rich media advertising product and media content (e.g., digital media content) presented in a media player. The techniques provide for simulated integration, creating an illusion to a user that the advertising content and digital media content are brought together in the media player. The techniques also provide for functional integration via interaction between the advertising product and the media player, including manipulation of spatial, temporal, and control components, resulting in a unique presentation of the advertising content and digital media content to the user. Spatial integration relates to the synchronization of position and coverage between the advertising product and the media player. Temporal integration relates to the coordination of content display timing between the advertising product and the media player. Control integration relates to the communication between the advertising product and the media player in transferring influence and priority of displayed content. The techniques advantageously enable dynamic and unexpected interplay between digital media content contained in an embedded media player and an interactive, persistent advertising product configured to capture the attention of a user and offer an engaging, memorable experience.

The invention, in one aspect, features a method for dynamic integration and non-linear presentation of advertising content and media content. The method includes receiving, by a server computing device, a request for media content from a remote computing device. The method also includes combining, by the server computing device, the requested media content and advertising content to provide an interactive advertising unit. The interactive advertising unit includes a first content layer including the requested media content and a media player, a second content layer including the advertising content, and an integration module for coordinating interaction between the first and second content layers. The coordinating interaction between the first and second content layers includes one or more of managing the spatial presentation of the requested digital media content and the advertising content, synchronizing the temporal presentation of the requested media content and the advertising content, and controlling the presentation priority of the requested media content and the advertising content. The method also includes transmitting, by the server computing device, the interactive advertising unit for presentation on the remote computing device, wherein the advertising content and the media content are presented concurrently.

The invention, in another aspect, features a system for dynamic integration and non-linear presentation of advertising content and digital media content. The system includes a server computing device. The server computing device is configured to receive a request for media content from a remote computing device. The server computing device is also configured to combine the requested media content and advertising content to provide an interactive advertising unit. The interactive advertising unit includes a first content layer including the requested media content and a media player, a second content layer including the advertising content, and an integration module for coordinating interaction between the first and second content layers. The coordinating interaction between the first and second content layers includes one or more of: managing the spatial presentation of the requested media content and the advertising content; synchronizing the temporal presentation of the requested media content and the advertising content; and controlling the presentation priority of the requested media content and the advertising content. The server computing device is also configured to transmit the interactive advertising unit for presentation on the remote computing device, wherein the advertising content and the media content are presented concurrently.

The invention, in another aspect, features a computer program product, tangibly embodied in a computer readable storage medium, for dynamic integration and non-linear presentation of advertising content and media content. The computer program product includes instructions operable to configure a data processing apparatus to receive a request for media content from a remote computing device. The computer program product also includes instructions operable to configure a data processing apparatus to combine the requested media content and advertising content to provide an interactive advertising unit. The interactive advertising unit includes a first content layer including the requested media content and a media player, a second content layer including the advertising content, and an integration module for coordinating interaction between the first and second content layers, wherein the coordinating includes one or more of: managing the spatial presentation of the requested media content and the advertising content; synchronizing the temporal presentation of the requested media content and the advertising content; and controlling the presentation priority of the requested media content and the advertising content. The computer program product includes instructions operable to configure a data processing apparatus to transmit the interactive advertising unit for presentation on the remote computing device, wherein the advertising content and the media content are presented concurrently.

In some embodiments, any of the above aspects can include one or more of the following features. In some embodiments, the requested media content is displayed in the media player of the interactive advertising unit.

In some embodiments, managing the spatial presentation includes positioning the advertising content over the media player so as to obscure the requested media content. In some embodiments, managing the spatial presentation includes positioning the advertising content in proximity to the media player so as to display the requested media content unobscured.

In some embodiments, the advertising content includes one or more product icons and managing the spatial presentation includes positioning the one or more product icons to align with a scrubber bar of the media player, wherein interaction with the product icons displays an advertisement in the interactive advertising unit. In some embodiments, interaction with the product icons includes receiving input based on a user action.

In some embodiments, synchronizing the temporal presentation includes displaying a pop-up window at a specified point during playback of the requested media content that coincides with the position of one of the product icons aligned with the scrubber bar.

In some embodiments, the advertising content includes a content rating application and managing the spatial presentation includes positioning the content rating application in proximity to the display window of the media player, wherein interaction with the content rating application includes determining a rating for the requested media content and storing the rating in a database. In some embodiments, interaction with the content rating application includes receiving input based on a user action. In some embodiments, the rating is based on a user evaluation of the requested media content.

In some embodiments, the advertising content includes a trivia game application and managing the spatial presentation includes positioning the trivia game application in proximity to the display window of the media player, wherein interaction with the trivia game application includes selecting answers to displayed questions. In some embodiments, interaction with the trivia game application includes receiving input based on a user action. In some embodiments, subject matter of the questions corresponds to a characteristic of the requested media content. In some embodiments, a reward is provided based on the selected answers.

Further features and advantages of the present invention as well as the structure and operation of various embodiments of the present invention are described in detail below with reference to the accompanying drawings.

DETAILED DESCRIPTION

In general overview, the techniques described herein are directed to methods and apparatuses, including computer program products, for dynamic integration and non-linear presentation of advertising content and media content (e.g., digital media content). As described in more detail, the advertising content is combined with the digital media content (displayed in, for example, a media player) in a seamless fashion to provide an interactive advertising unit. The creation of the interactive advertising unit provides the advantages of greatly increasing a user's exposure to the advertising content while not materially diminishing the user's consumption of the digital media content. The nature of the interactive advertising unit, displaying advertising content in proximity to requested digital media content, allows the use of a broad range of marketing techniques, such as product placement, brand association, and click-through opportunities. Thus, the techniques provide an opportunity for manufacturers to increase the effectiveness of their advertising while maintaining the accessibility and appeal of the requested digital media content.

The display of the advertising content and digital media content is not limited to a web browser or traditional embedded media player. For example, the advertising content and/or video content can be displayed to a user via an interactive application downloaded and executed on a smart phone, i.e., an "app" configured to run on the iPhone® from Apple® Computer, Inc.

Figure 1:
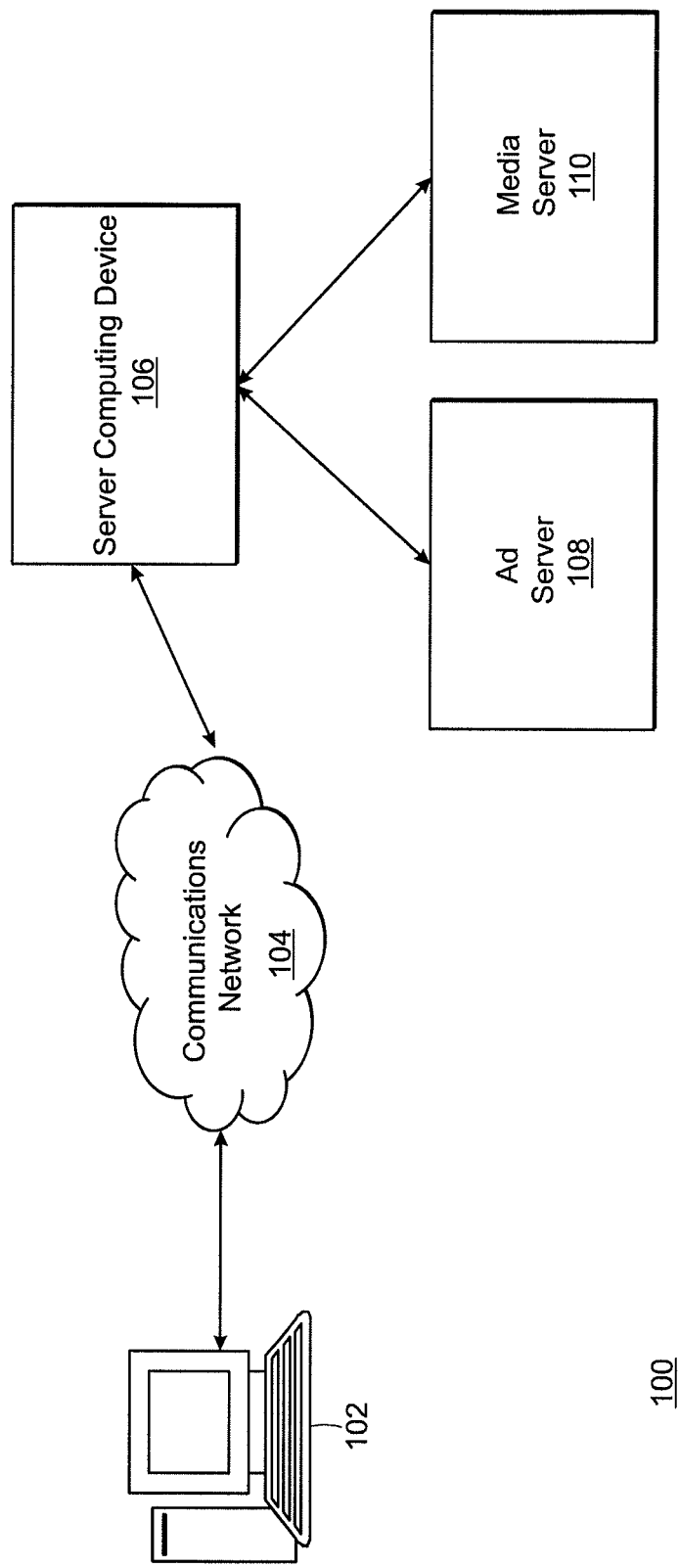
FIG. 1 is a block diagram of a system for the dynamic integration of advertising and media content.

FIG. 1 is a block diagram of a system 100 for dynamic integration of advertising and media content. The system 100 includes a client computing device 102, a communications network 104, and a server computing device 106. In some embodiments, the server computing device 106 is connected to one or more other computing devices which provide advertising content (e.g., ad server 108) and digital media content (e.g., video server 110). The server computing device 106, ad server 108, and video server 110 can reside at the same physical location or may be dispersed to multiple physical locations. The server computing device 106, ad server 108, and video server 110 can be located on the same physical device or one or more of the servers 106, 108, 110 can be distributed over many devices. The server computing device 106, ad server 108, and video server 110 can communicate via a communications network, for example communications network 104.

The client computing device 102 is the hardware that displays the interactive advertising unit containing advertising content and digital media content to a user. Example computing devices take on many forms, including but not limited to a personal computer, a standalone video player, a home video game console, a portable video game system, a personal digital assistant (PDA), an internet appliance, a smart phone, a set-top box, or the like. The computing device 102 includes network-interface components to enable the user to connect to a communications network 104, such as the Internet. The computing device 102 also includes browser software to enable the user to interact with web sites and other content providers. Some example browser software includes Microsoft® Internet Explorer, Mozilla Firefox®, or other similar software applications. The client computing device 102 also includes digital content playback plug-ins or standalone software to enable the user to view digital media content (e.g., video and audio) received over the communications network 104. Examples of digital media content playback software includes Microsoft® Windows Media® Player, Adobe® Flash® Player, QuickTime® from Apple® Computer, Inc., or other similar applications.

The server computing device 106 hosts web pages and other similar content, and receives content requests from the client computing device 102 via the communications network 104.

The communications network 104 channels communications from the client computing device 102 to the server computing device 106. The network 104 may be a local network, such as a LAN, or a wide area network, such as the Internet or the World Wide Web.

The ad server 108 hosts advertising content for use by the server computing device 106. In some embodiments, the ad server 108 receives requests for advertising content directly from the client computing device 102 via the communications network 104. In some embodiments, the ad server 108 receives requests for advertising content from the client computing device 102 by way of the server computing device 106. Advertising content can take a variety of forms. Examples include a static banner ad, a graphical animation or an interactive, rich media application that contains graphics, animation, audio, and/or video content, such as a Flash® application.

The media server 110 hosts digital media content for use by the server computing device 106. In some embodiments, the media server 110 can receive requests for digital media content from the client computing device 102 via the communications network 104. In some embodiments, the media server 110 receives requests for advertising content from the client computing device 102 by way of the server computing device 106. The digital media content can take a variety of forms. The media content can be short-form video content, i.e., a four-minute music video. The media content can be long-form video content, i.e., a thirty-minute television program. The media content can be audio content, i.e., a radio broadcast. Other examples include user-submitted amateur video, professional television shows, motion pictures, webcasts, podcasts, music videos, or other similar content.

Figure 2:
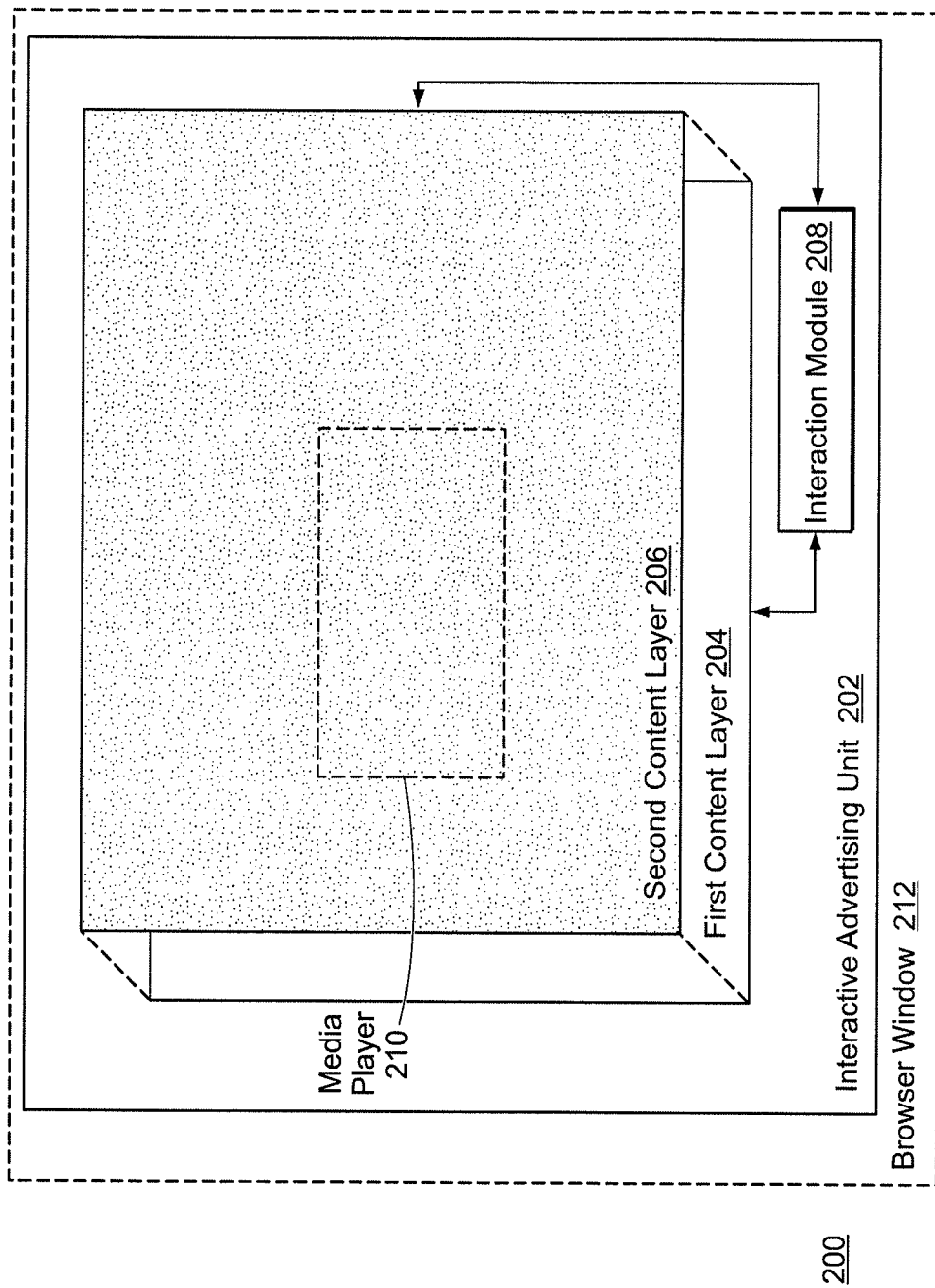
FIG. 2 is a diagram of an interactive advertising unit for displaying advertising content and media content

FIG. 2 is a diagram 200 of an interactive advertising unit 202 for displaying media content and advertising content.

A user interacts with the system 100 by opening a web browser 212 on the client computing device 102 and entering the address of the web server 106. The client computing device 102 sends a content request associated with the address entered by the user to the server computing device 106. Once the server computing device 106 receives the request, the server computing device 106 retrieves the requested content and transmits the content for display in the web browser 212 on the computing device 102. For example, the user can enter a standard web address, such as http://www.mtv.com/videos/, into the browser window 212 at the computing device 102. The web server 106 can then transmit the web page located at mtv.com/videos/ to the computing device 102 for display in the browser 212.

In yet other examples, the owner of the server computing device 106 may wish to present an advertisement to the user when the user requests digital media content. As above, the user interacts with the system 100 by entering or navigating to the address of media content associated with the server computing device 106. Upon receiving the request, the server computing device 106 retrieves the requested media content (e.g., from media server 110). Before transmitting the requested media content to the computing device 102, the server computing device retrieves advertising content (e.g., from the ad server 108). In some embodiments, the advertising content is selected by the server computing device 106 based on predetermined criteria, such as a focused advertising campaign. Examples of an advertising campaign can include a predetermined number of displays of the advertising content, a predefined period of time in which the advertising content will be selected for display, a marketing association between the owner of the advertising content, the producer of the requested video content, and the like. The server computing device 106 combines the advertising content and the requested digital media content to provide an interactive advertising unit 202. The server computing device 106 transmits the interactive advertising unit 202 to the client computing device 102 for presentation to a user. The interactive advertising unit 202 presents the advertising content (e.g., from ad server 108) along with the digital media content requested by the user (e.g., from media server 110) in a number of interesting, memorable, and dynamic ways, as shown below.

In some embodiments, the server computing device 106 combines the digital media content and the advertising content into an interactive advertising unit 202 using a multi-layered approach. The server computing device 106 places the digital media content and associated media player into a first content layer 204, and places the advertising content into a second content layer 206. In one embodiment, the second content layer 206 is positioned on top of the first content layer 204 of the interactive advertising unit 202. The interactive advertising unit 202 is transmitted to the client computing device 102 for display, such as in browser window 212 (e.g., embedded in a larger web page). In some embodiments, the interactive advertising unit 202 provides the second content layer 206 using the <div> tag provided by the HTML programming language, in association with Cascading Style Sheets (CSS) to coordinate presentation attributes of the <div> tag.

The interactive advertising unit 202 includes an interaction module 208 which coordinates the interactions between the content layers (e.g., first content layer 204 and second content layer 206). The interaction module 208 manages the spatial presentation, synchronizes the temporal presentation, and controls the presentation priority of the advertising content and the digital media content in the respective content layers 204 and 206. The interaction module 208 coordinates the spatial, temporal, and control functionality to work in concert with each other, advantageously merging the features of each presentation type.

Management of the spatial relationship between the digital media content and the media player in the first content layer 204, and the advertising content in the second content layer 206, is important to providing an engaging and dynamic experience to the user. In one embodiment, the interaction module 208 of the interactive advertising unit 202 positions the second content layer 206 in certain areas above the first content layer 204, thereby enabling the strategic placement of the advertising content in an area that catches the user's attention while keeping the digital media content in the first content layer 204 unobstructed and available for viewing. In another embodiment, the interaction module 208 of the interactive advertising unit 202 positions the second content layer 206 in certain areas above the first content layer 204 in a way that masks or obscures the digital media content in the first content layer 204. In this embodiment, the interaction module 208 leverages the masking of the digital media content to emphasize the advertising content or to reveal the digital media content to the user in a dramatic and unexpected way. In any of these embodiments, the second content layer 206 can be partially or fully transparent until the interactive advertising unit 202 displays the advertising content.

Synchronization of the temporal relationship between the digital media content and the media player in the first content layer 204, and the advertising content in the second content layer 206, is also important to achieving a unique and unexpected user experience. In one embodiment, the interaction module 208 displays advertising content (e.g., a pop-up ad) at strategic points during presentation of the digital media content to assist the user in making a "connection" between the advertised goods and the media content. In another embodiment, the interaction module 208 displays advertising content at predetermined intervals during presentation of the digital media content by the media player 210. In this embodiment, the interaction module 208 can display a visual indicator to the user that an advertisement will appear, thereby increasing the user's anticipation and engagement in the content.

In addition, control of the presentation priority between the digital media content in the first content layer 204, and the advertising content in the second content layer 206, is important for augmenting the interactive functionality of the interactive advertising unit 202 to increase user interest in and appeal of the presented content. In one embodiment, the interaction module 208 of the interactive advertising unit 202 displays the requested digital media content and the advertising content concurrently. In this embodiment, the interaction module 208 satisfies the user by presenting the requested media content in the media player 210 shortly after the request is received by the server computing device 106, but also integrates the display of the advertising content seamlessly into the overall presentation to enable advertising opportunities that are dynamic and interesting.

Although shown as covering almost the entire browser window 212, the content layers 204 and 206 of the interactive advertising unit 202 can vary in size and cover any portion of the browser window 212. In some embodiments, the interactive advertising unit 202 includes multiple content layers, in addition to the first and second content layers 204 and 206. In one embodiment, the interactive advertising unit 202 places one content layer (e.g., second content layer 206) above a media player 210 contained in another content layer (e.g., first content layer 204), while in another embodiment the interactive advertising unit 202 places another separate content layer (not shown) above a different section of the browser window 212, such as above the top portion or in a side margin. The interaction module 208 of the interactive advertising unit 202 coordinates the spatial presentation management, temporal presentation synchronization, and the presentation priority control of the content residing in each of the provided content layers (e.g., layers 204 and 206). In one embodiment, the interaction module 208 uses a protocol such as LocalConnections provided in the Adobe Flash® development tool to communicate between the respective content layers (e.g., layers 204 and 206).

Figure 3A:
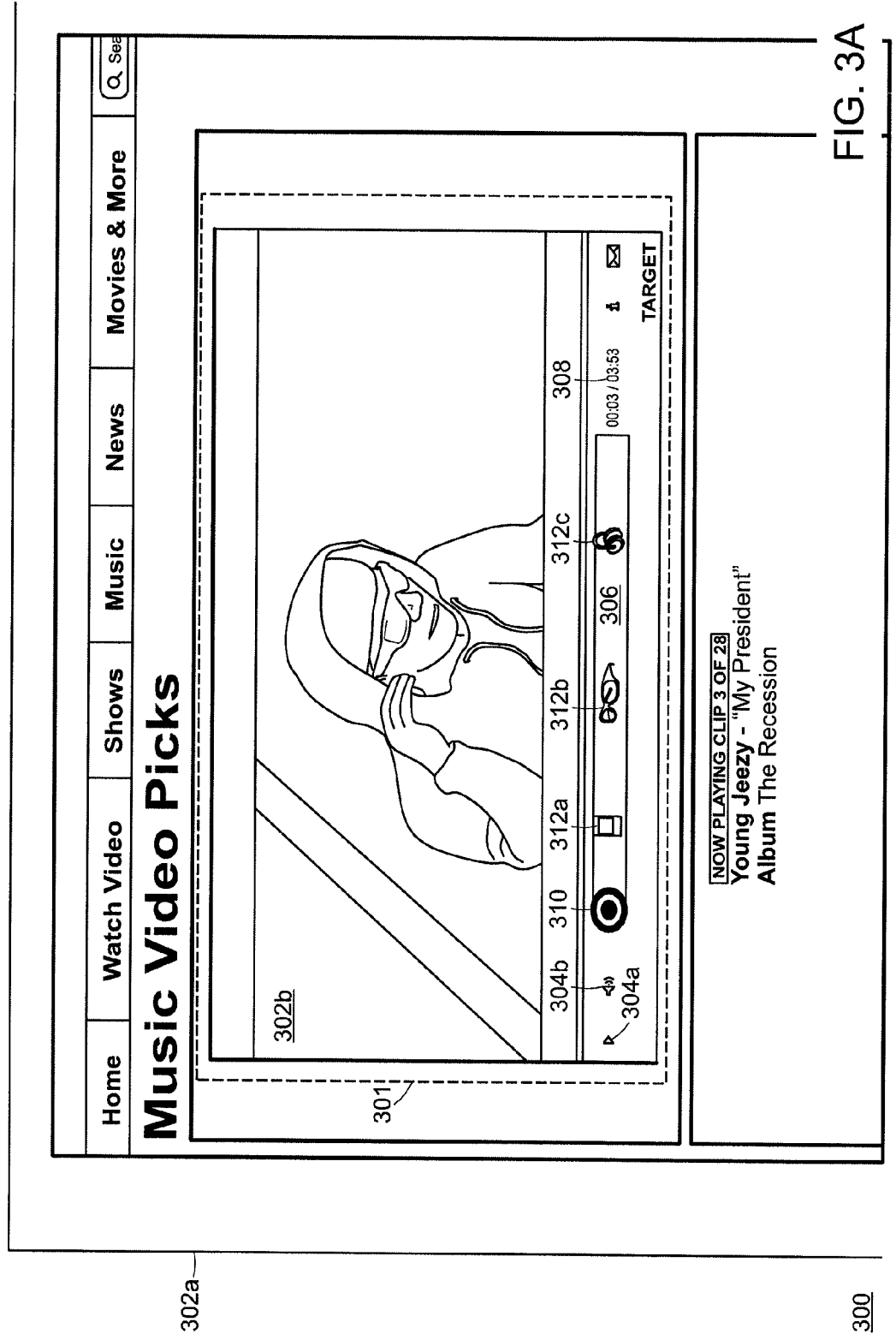
FIGS. 3A-3C are screenshots of an exemplary embodiment of an interactive advertising unit provided by the system, wherein interactive product icons are integrated at various intervals with the scrubber bar of the media player.
Figure 3B:
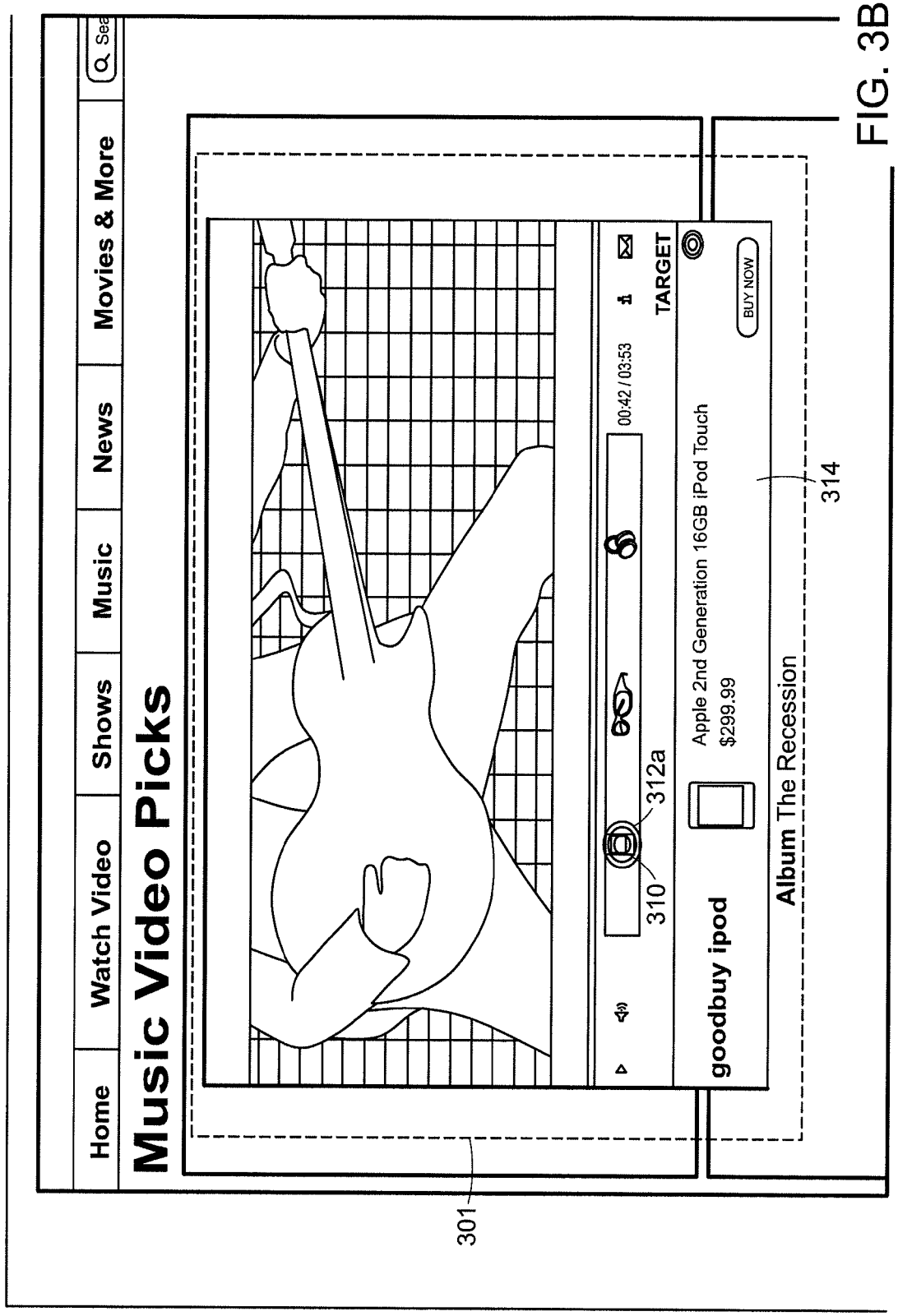
Figure 3C:
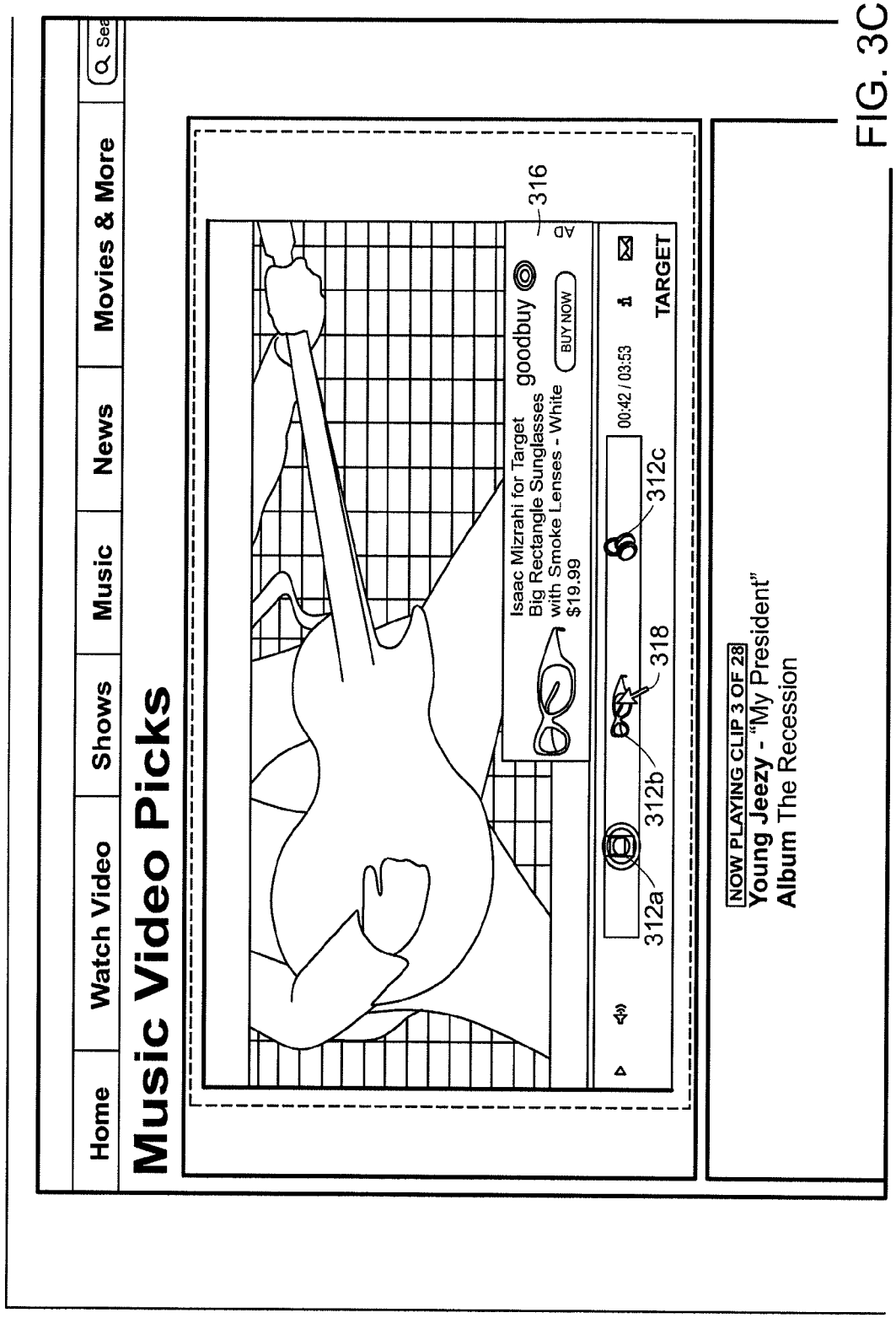

FIGS. 3A-3C are screenshots of an exemplary embodiment of an interactive advertising unit (e.g., interactive advertising unit 301) provided by the system 100, wherein the advertising content includes interactive product icons 312a-c integrated at various intervals in a scrubber bar 306 of a media player 302b. The interactive advertising unit enables the product icons 312a-c to function within the context of the media player window 302b and trigger the display of advertisements associated with products represented by the icons 312a-c.

A common feature of many media players is the display of a progress bar 306 (also called a "scrubber bar"), usually at the bottom of the media player window 302, to indicate the total running time of the video along with the elapsed time of the portion of the video played so far. Generally, the scrubber bar 306 is depicted as a horizontal, rectangular box with a numeric representation 308 of the elapsed and/or total running times located to the right of the box. When the video content starts playing, a visual indicator 310 moves from left to right in the box while the elapsed time increases in a standard time unit (usually measured in seconds). The indicator 310 can be an arrow, a pointer, a vertical bar or the like. Often the area between the left side of the box and the visual indicator 310 will fill in with a different shading or color as the indicator 310 moves across the media player window 302, which represents the amount of elapsed time. A shading or color that greatly contrasts with the surrounding colors of the media player 302 can be used to give the consumer a quick and easy-to-see reference as to how much of the video has played and how much still remains to be played. For example, a black or gray scrubber bar might fill with a bright red color as the video content is played. Advantageously, users often look to the scrubber bar 306 during the playback of a video, thereby giving it greater potential for advertising exposure.

When a user sends a media content request from the client computing device 102 to the server computing device 106 by navigating to a web page that hosts the desired digital media content, the server computing device 106 retrieves the requested content (e.g., from media server 110) and retrieves advertising content (e.g., from ad server 108). The server computing device 106 provides an interactive advertising unit 301 using the retrieved media content and advertising content. The interactive advertising unit 301 includes a first content layer which contains a media player 302b for presenting the digital media content in a browser window 302a. The interaction module of the interactive advertising unit 302 begins playback of the digital media content in the media player 302b automatically when the browser window 302a finishes loading the web page, or upon receipt of an interaction from the client computing device 102. For example, the user clicks the play/pause button 304a or, alternatively, clicks inside the boundaries of the media player window 302b to begin playback of the digital media content. The media player window 302b contains several controls to allow the user to interact with playback of the video content, such as, for example, the play/pause button 304a and a volume control button 304b, among other features.

The interactive advertising unit 301 includes a second content layer above the first content layer, and places the advertising content within the second content layer. In this example, the second content layer covers the entire area of the first content layer, including the media player window 302b and its features as the default media player controls (e.g., 304a-b), the scrubber bar 306, and the elapsed time 308. The content in the second content layer covers up the media player, and instead displays an alternative representation of the media player, including the product icons 312a-c, which are interspersed throughout the scrubber bar 306. In this example, the second content layer is transparent above the first content layer containing the actual display area of the media player 302b, allowing the user an unobstructed view of the digital media content.

The interaction module of the interactive advertising unit 301 determines the placement of the product icons 312a-c in the second content layer. In one embodiment, the interaction module runs an algorithm that determines the time intervals at which to place the icons 312a-c. The algorithm may divide the total running time of the video by the number of icons 312a-c (e.g., three) the advertiser wants to display. In another embodiment, the interaction module positions the product icons 312a-c according to preferences exhibited by an advertiser, such as correlation with media content displayed at a specific point in time. In other embodiments, the interaction module positions the product icons 312a-c based on advertising content displayed to the user such that activation or triggering of the product icons 312a-c is synchronized with display of a certain advertising feature to the user.

The interactive advertising unit 301, in conjunction with the interaction module (e.g., interaction module 208, begins to play the media content in the media player 302b automatically when the browser window 302a finishes loading the requested web page, or upon interaction by the user. For example, the user clicks the play/pause button 304a or, alternatively, clicks inside the boundaries of the media player window 302b to begin playback of the video content.

When a user at the client computing device 102 attempts to interact with the media player 302b controls, the interaction module of the interactive advertising unit 301 receives the interaction request and communicates with the media player 302b in the first content layer so that the user's interactions have the effect of manipulating the same controls on the media player 302b itself. For example, if the user wishes to pause a currently-playing video, he would click the play/pause button 304a. However, that click occurs on the second content layer containing the advertising content, and accordingly the media player 302b in the first content layer would not automatically receive notification of the user action. As a result, the interaction module of the interactive advertising unit 301, for example, transmits a command to the media player 302b in the first content layer, instructing the player 302b to pause the video content. The media player 302b receives the command to pause the video and does so, even though the user believes that his click of the play/pause button 304a had a direct effect on the media player 302b.

Continuing with FIG. 3A, the interactive advertising unit 301 has just begun to play the requested digital media content in the media player 302b in the first content layer. At the same time, a visual indicator 310 located in the second content layer 302c and which may be associated with an advertiser (e.g., the bull's eye symbol of Target Corp.) begins to move from left to right in the scrubber bar 306 to indicate the elapsed time (e.g., "00:03/03:53" as indicated by reference 308) of the media content.

In FIG. 3B, the visual indicator 310 has reached the point in the scrubber bar 306 that correlates to the first product icon 312a (e.g., an MP3 player icon). When the visual indicator 310 is directly lined up with the product icon 312a, the interactive advertising unit 301 displays a "pop-out" window 314 in the second content layer. The interaction module of the interactive advertising unit 301 positions the pop-out window 314 to appear below the media player 302b. The pop-out window 314 contains a more detailed description of the product represented by the first product icon 312a, such as, for example, a larger picture of the product, a textual description, a suggested price, and a "Buy Now" link. The user can click the link to be directed to the advertiser's external website, where he can purchase the product. The pop-out window 314 can appear for a predefined time duration (e.g., 10 seconds), until the visual indicator 310 no longer lines up with the first product icon 312a, until the user takes some action to cancel the advertisement window 314 (e.g., clicks a cancel button), or until the visual indicator 310 reaches the second product icon 312b. The pop-out window 314 can fade in and/or fade out. In some embodiments, the pop-out window 314 is semi-transparent, partially obscuring the digital media content and media player in the browser window 302a while still allowing the user to view the media content through the pop-out window 314. In some cases, the pop-out window 314 can be immediately preceded by an additional advertisement window (not shown), indicating to the user that the pop-out window 314 is about to appear. Similar functionality occurs when the visual indicator 310 is lined up with the second product icon 312b and third product icon 312c, respectively.

In addition, when the user at the client computing device 102 hovers the mouse pointer over one of the product icons 312a-c in the scrubber bar 306, the interactive advertising unit 301 invokes the appearance of another advertisement window (not shown). The interactive advertising unit 301 can invoke the window at any time during playback of the requested digital media. FIG. 3C illustrates an example where the user manipulates the mouse pointer 318 to hover over the product icon 312b. The interactive advertising unit 301 displays a "pop-in" window 316 containing detailed information about the product associated with the selected product icon 312b. As with the pop-out window 314 in FIG. 3B, the pop-in window 316 displays characteristics such as a larger picture of the product, a textual description, a suggested price, and a "Buy Now" link to direct the user to the advertiser's external website. The interaction module of the interactive advertising unit 301 positions the pop-in window 316 in the second content layer to appear within the boundaries of the media player window 302b, and obscures a portion of the requested digital media content located in the first content layer.

In some embodiments, the pop-in window 316 appears for a predefined time duration (e.g., 10 seconds), until the user moves the mouse pointer 318 away from the selected icon 312b, or until the user takes some action to cancel the advertisement window 316 (e.g., clicks a cancel button). In some embodiments, the pop-in window 316 fades in and/or fades out. The pop-in advertisement window 316 in the second content layer can be semi-transparent, partially obscuring the digital media content in the first content layer while still allowing the user to view the remainder of the media content unobstructed. In some embodiments, the pop-in window 316 is immediately preceded by an additional advertisement window (not shown), indicating to the user that the pop-in window 316 is about to appear.

As noted above, the user can move the icon over product icon 312a or product icon 312c and a process similar to the one described for icon 312b takes place. The advertising in the pop-in window 316 changes to match the icon. For example, for the icon 312a, an MP3 player advertisement would appear, since the icon 312a represents and depicts a MP3 player. For icon 312c, a headphones advertisement would appear, since the icon 312c represents and depicts headphones. In addition to hovering over the product icon (e.g., icon 312c), the user can also slide the visual indicator 310 anywhere in the scrubber bar. As a result of this manipulation by the user, the interactive advertising unit 301, in conjunction with the interaction module, controls playback of the media content by moving forward or backward in the media content depending on the user's action. As the visual indicator 310 moves over any of the icons 312a-c, the interactive advertising unit 301 presents the corresponding pop-in window 316 as explained above. In other examples, as the visual indicator 316 moves over a product icon (e.g., product icon 312a), the interactive advertising unit 301 first displays a pop-in window (e.g., pop-in window 314) briefly in the media player 302b to catch the viewer's attention (e.g., as shown in FIG. 3C) and then after a short time duration (e.g., three seconds), the pop-in window 314 falls below the scrubber bar 306, outside of the media player 302b (e.g., as shown in FIG. 3B) and remains for another short, but longer than the first, time duration (e.g., ten seconds).

Figure 4A:
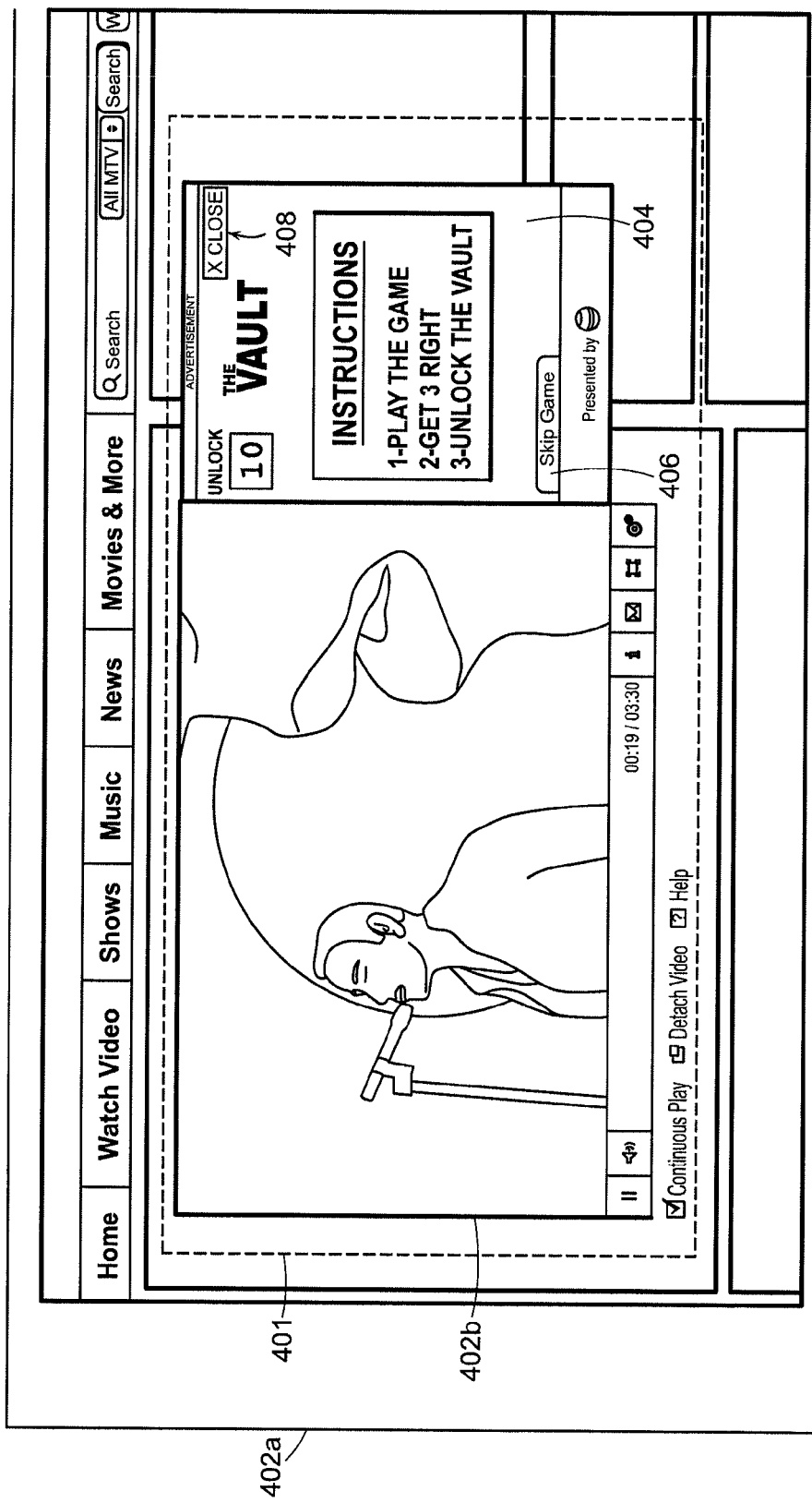
FIGS. 4A-4C are screenshots of an exemplary embodiment of an interactive advertising unit provided by the system, wherein the advertising content includes an interactive trivia game "fly-out" advertisement combined with digital media content.
Figure 4B:
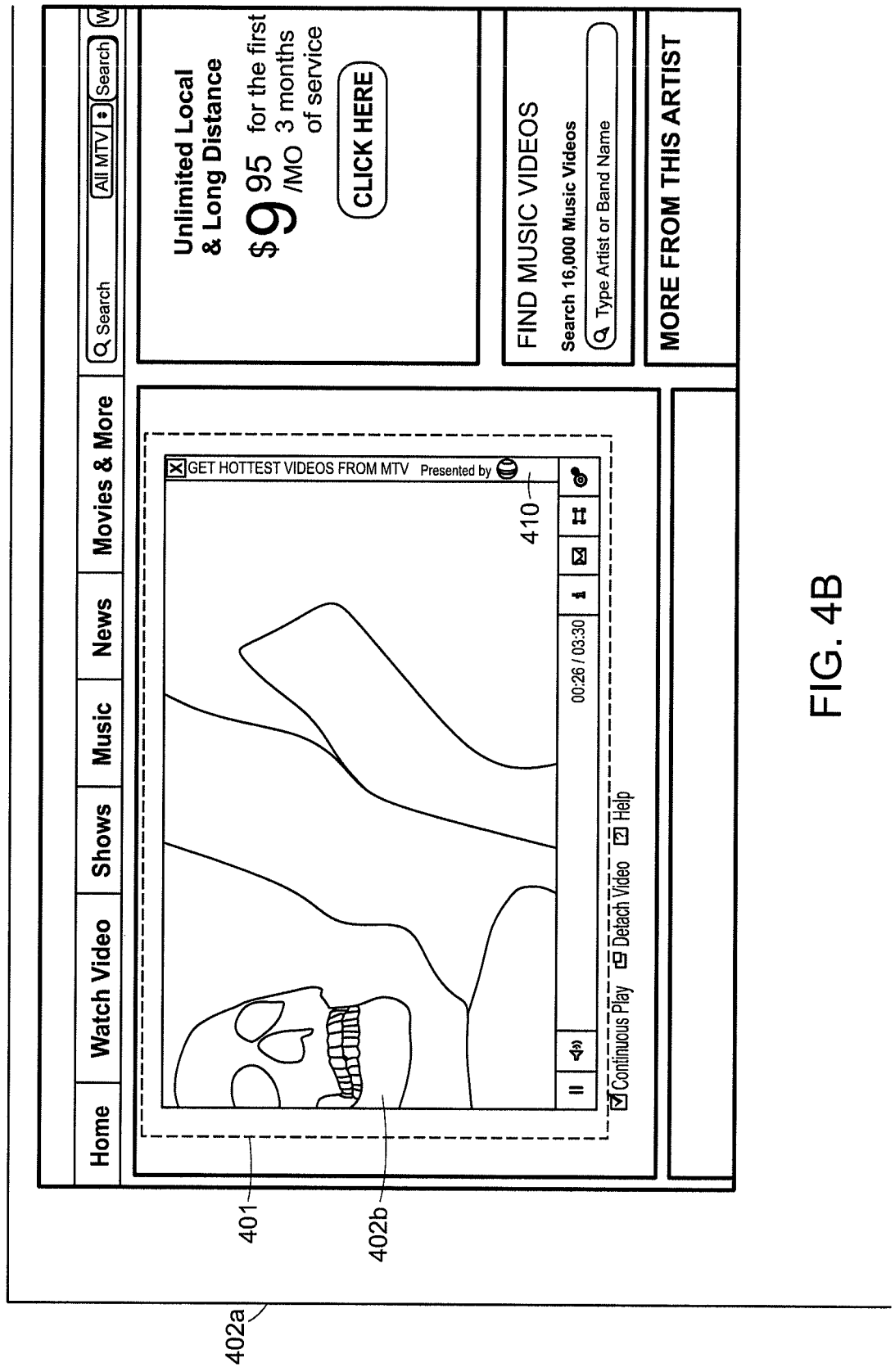
Figure 4C:
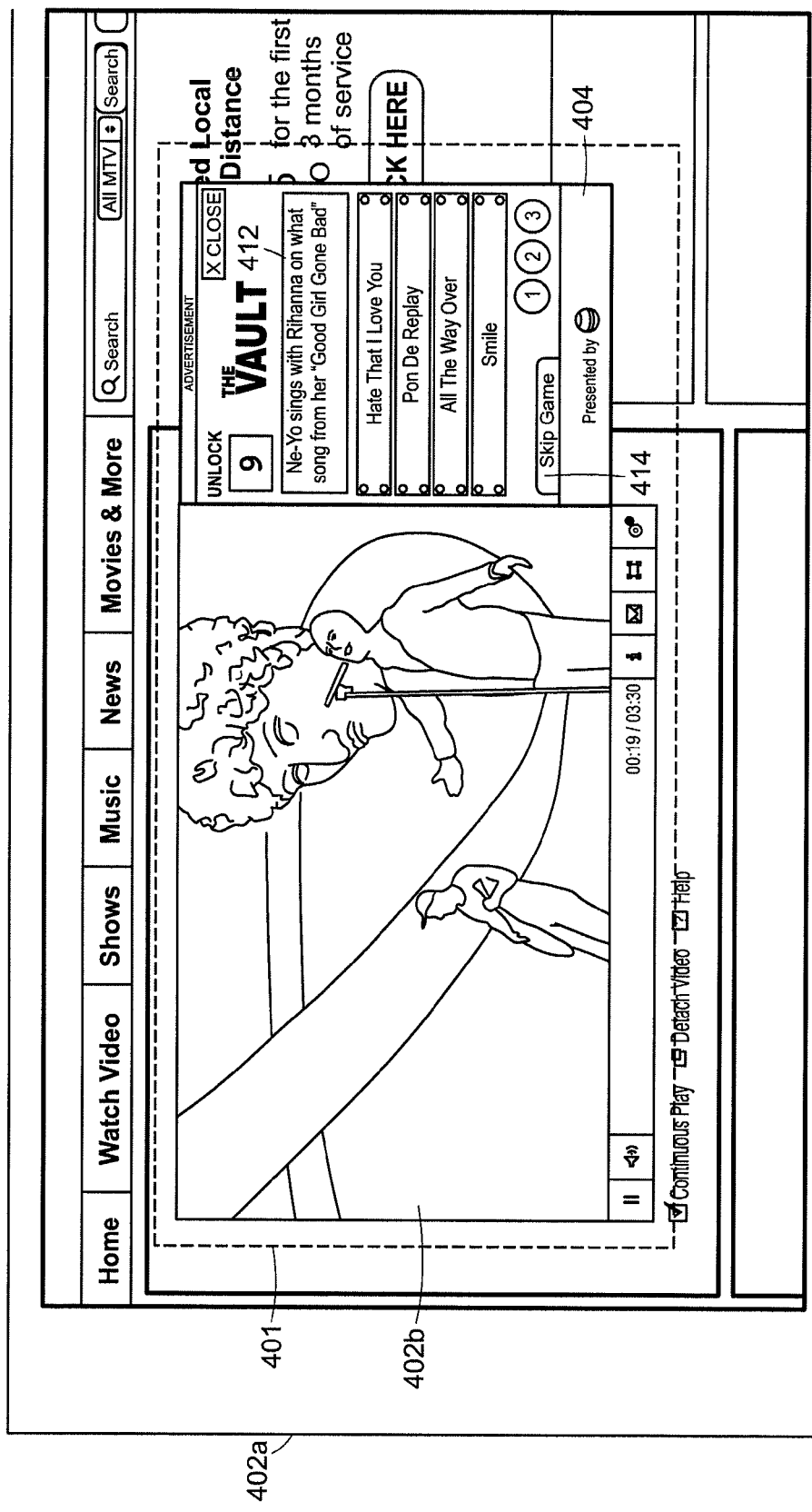

FIGS. 4A-4C are screenshots of an exemplary embodiment of an interactive advertising unit 401 provided by the system 100, wherein the advertising content includes an interactive trivia game "fly-out" advertisement combined with digital media content.

The server computing device 106 combines the advertising content and digital media content to provide an interactive advertising unit 401. The interactive advertising unit 401 places the digital media content in a first content layer, which includes a media player 402b for displaying the digital media content (e.g., in a web browser window 402a). The interactive advertising unit 401 includes a second content layer above the first content layer, and places the advertising content within the second content layer. In this example, the advertising content within the second content layer contains a "fly-out" interactive trivia game advertisement 404. When the server computing device 106 transmits the interactive advertising unit 401 to the client computing device 102, the interactive advertising unit 401, in conjunction with the interaction module, begins to play the digital media content in the media player 402b of the first content layer, while the second content layer 402c displays the interactive trivia game content with instructions on how to play the game. The user can decide to participate in the trivia game by not taking any action.

Alternatively, the user can click the "skip game" button 406 to dismiss the fly-out advertisement 404. The user can also click the close button 408 in the upper right-hand corner of the fly-out advertisement 404 to cause the interactive advertising unit 401 to reduce the game window into a small area 410 at the border of the media player 402b, as shown in FIG. 4B. The area 410 is part of the advertising content presented in the second content layer of the interactive advertising unit 401. If the user wishes to interact with the trivia game advertisement after he minimizes the game window, the user can click the small area 410 to cause the interactive advertising unit 401 to expand the trivia game advertisement back to the original fly-out advertisement 404.

FIG. 4C shows the interactive advertising unit 401 displaying the trivia game fly-out advertisement in the second content layer. If the user decides to proceed with the trivia game, the server computing device 106 retrieves advertising content (e.g., from ad server 108). In this embodiment, when the interactive advertising unit 401 begins to display the advertising content, the interactive advertising unit 401 displays a group of trivia questions in the fly-out advertisement 404, selects a trivia question 412 and four possible answer choices from the group of trivia questions, and displays the question and answers in the fly-out advertisement 404. In some embodiments, the interactive advertising unit 401 provided by the server computing device 106 issues the request via XML, PHP, or other similar protocols. In some embodiments, the interactive advertising unit 401 requests questions that are related in genre or subject matter to the requested digital media content. For example, if the user requests a hip-hop music video, the server computing device 106, via the interactive advertising unit 401, can request trivia questions pertaining to the hip-hop genre. Other examples of genres include but are not limited to rock, pop, country, R&B, rap, and classic rock. In other embodiments, the group of questions are random and change upon each animation of the advertising content. The user selects an answer by clicking in the appropriate box containing the desired response.

If the user answers the question correctly, the interactive advertising unit 401 transmits a message to the server computing device 106 to request another question, and then displays that question in the fly-out advertisement 404. If the user answers the question incorrectly, the interactive advertising unit 401 displays a message indicating the answer was incorrect and providing the same question again with the remaining possible answer choices in the fly-out advertisement 404. If the user correctly answers a pre-defined number of trivia questions (e.g., six), the server computing device 106 retrieves advertising content containing, for example, a link to a reward site where the user can view special content (e.g., digital media content not available through any other means). The interactive advertising unit 401 displays the reward link (not shown) in the fly-out advertisement 404. In some embodiments, the user can opt to bypass the interactive game by clicking a "Skip Game" button 414 in the fly-out advertisement 404, and is directed to content available to the general public.

Figure 5A:
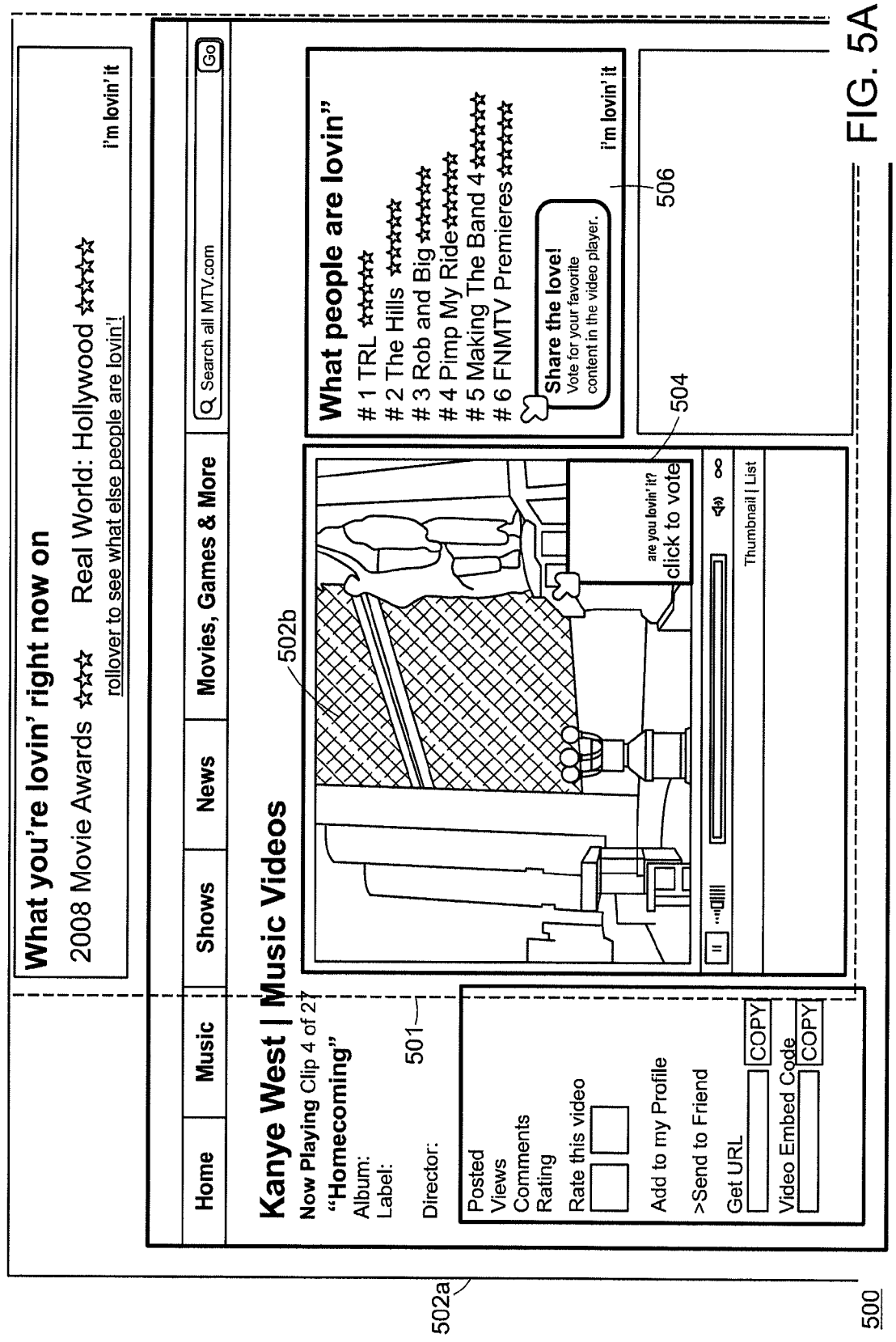
FIGS. 5A-5B are screenshots of an exemplary embodiment of an interactive advertising unit provided by the system, wherein the interactive advertising unit includes a ratings system application as advertising content combined with the digital media content.
Figure 5B:
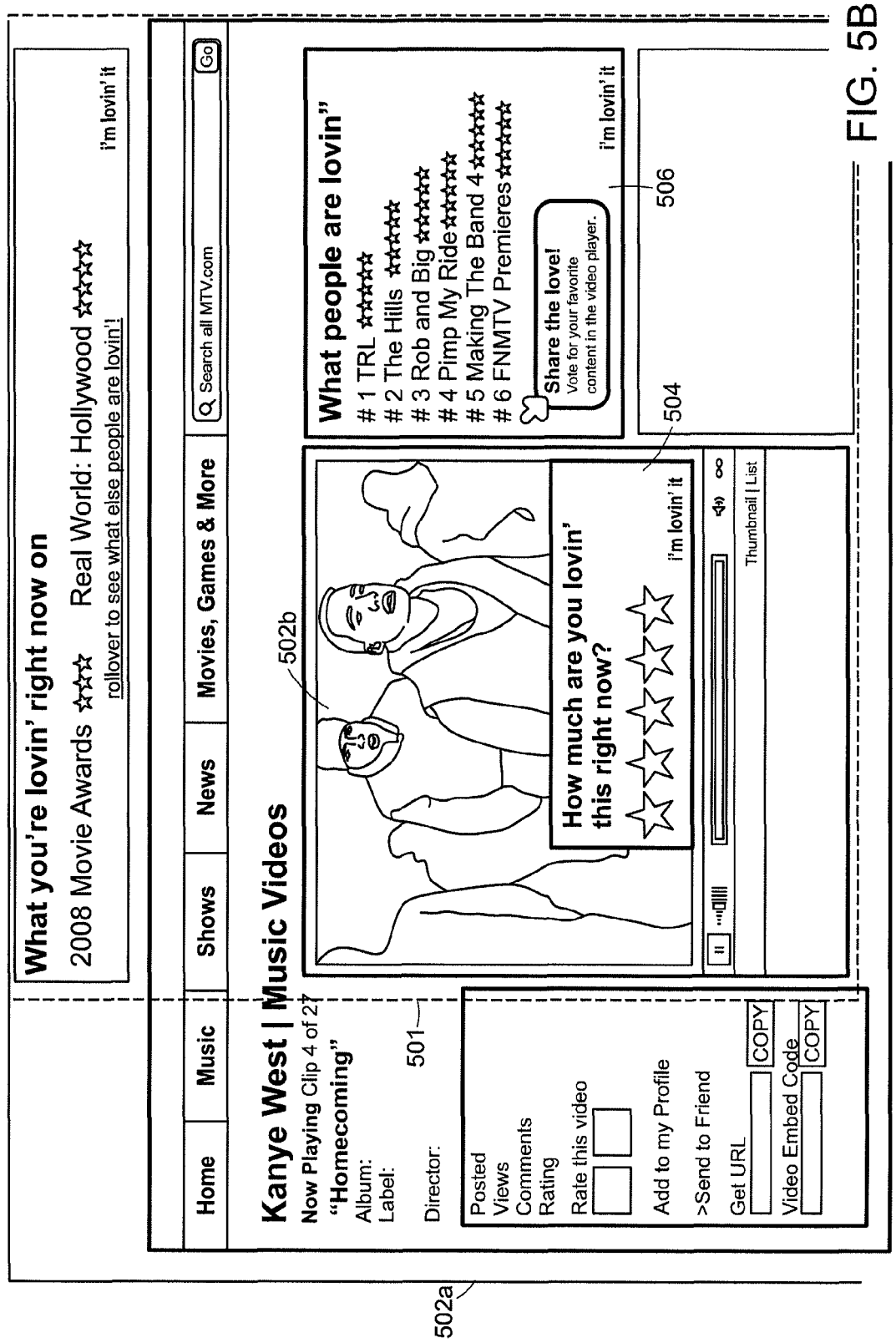

FIGS. 5A-5B are screenshots of an exemplary embodiment of an interactive advertising unit 501 provided by the system 100, wherein the interactive advertising unit 501 includes a ratings system application as advertising content combined with the digital media content.

The server computing device 106 combines the advertising content and digital media content to provide an interactive advertising unit 501, as shown in FIG. 5A. The interactive advertising unit 501 places the ratings system application into the second content layer, and places the digital media content in the first content layer which includes the media player 502b in the browser window 502a. When the user at the client computing device (e.g., client computing device 102) navigates to a web page that hosts the desired digital media content, the server computing device 106 receives the request and retrieves the requested media content (e.g., from video server 110) and advertising content (e.g., from ad server 108). In this embodiment, the advertising content in the second content layer contains a small corporate logo 504 (e.g., the McDonald's "golden arches"). The interaction module of the interactive advertising unit 501 positions the advertising content to appear in the lower right-hand corner of the media player 502b. In addition, the advertising content in the second content layer includes a tabulation of the most-loved (i.e., popular) content as determined by other users of the system 100. When the interactive advertising unit 501 first displays the advertising content in the second content layer, the logo 504 is semi-transparent. When the user manipulates the mouse pointer to hover above the corporate logo 504, the interactive advertising unit 501 displays an animation which changes the logo 504 to a bright color, generates a box around the logo 504, and displays a "click to vote" message.

When the user at the client computing device 102 clicks the mouse on the animated corporate logo 504, the interactive advertising unit 501 displays a transition from the logo 504 to a five-star rating mechanism 508, as shown in FIG. 5B. The user can then select a rating from one to five stars in accordance with how much he "loves" the video content, with five stars being the most-loved. Once the user clicks on a star to determine a rating for the digital media content, the interactive advertising unit 501 receives the rating in the second content layer and transmits the rating to the server computing device 106. The server computing device 106 stores the rating and other information associated with the digital media content and/or the user (e.g., the filename, user id, etc.) in a database which tracks ratings received from users viewing digital media content provided by the server computing device 106. In some embodiments, the server computing device 106 retrieves an overall ratings "leaderboard" from the database and transmits information concerning the most popular video content to the interactive advertising unit 501. The interactive advertising unit 501 displays the leaderboard in the second content layer. In some embodiments, the interactive advertising unit 501 dynamically displays updated rankings which factors the user's rating of the currently-played digital media content into account by storing the current user's rating in a database, calculating a new ranking for the media content rated by the current user, and determining a new ratings leaderboard based on the new ranking of the recently-rated digital media content.

The above-described systems and methods can be implemented in digital electronic circuitry, in computer hardware, firmware, and/or software. The implementation can be as a computer program product (i.e., a computer program tangibly embodied in a computer readable medium). The implementation can, for example, be in a machine-readable storage device and/or include a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array), an ASIC (application-specific integrated circuit), a DSP (digital signal processor), and/or any other discrete circuitry that is configured to implement the required functions. Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Computer readable mediums suitable for embodying computer program instructions and data include all forms of non-volatile memory, including by way of example semiconductor memory devices. The computer readable mediums can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The client device and the computing device can include, for example, a computer, a computer with a browser device, a telephone, an IP phone, a mobile device (e.g., cellular phone, personal digital assistant (PDA) device, smart phone, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®.

The web servers can be, for example, a computer with a server module (e.g., Microsoft® Internet Information Services available from Microsoft Corporation, Apache Web Server available from Apache Software Foundation, Apache Tomcat Web Server available from Apache Software Foundation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communication networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

The invention claimed is:

1. A method for dynamic integration and linear presentation of advertising content and media content, the method comprising:
   receiving, by a server computing device, a request for media content from a remote computing device;
   combining, by the server computing device, the requested media content and advertising content to provide an interactive advertising unit, wherein the interactive advertising unit comprises:
   a first content layer including the requested media content and a media player;
   a second content layer including the advertising content; and
   an integration module for coordinating interaction between the first and second content layers, wherein the coordinating includes one or more of:
   managing the spatial presentation of the requested media content and the advertising content;
   synchronizing the temporal presentation of the requested media content and the advertising content including, including the advertising content in a pop-up window (i) at one or more predetermined intervals or (ii) in response to user input during playback of the media content; and
   controlling the presentation priority of the requested media content and the advertising content; and
   transmitting, by the server computing device, the interactive advertising unit for presentation on the remote computing device, wherein the advertising content and the requested media content are presented concurrently.

2. The method of claim 1, wherein the requested media content is displayed in the media player of the interactive advertising unit.

3. The method of claim 1, wherein managing the spatial presentation includes positioning the pop-up window containing the advertising content over the media player so as to obscure the requested media content.

4. The method of claim 1, wherein managing the spatial presentation includes positioning the pop-up window containing the advertising content in proximity to the media player so as to display the requested media content unobscured.

5. The method of claim 1, wherein the advertising content includes a content rating application and managing the spatial presentation includes positioning the pop-up window containing the content rating application in proximity to the display window of the media player, wherein interaction with the content rating application includes determining a rating for the requested media content and storing the rating in a database.

6. The method of claim 5, wherein interaction with the content rating application includes receiving input based on a user action.

7. The method of claim 5, wherein the rating is based on a user evaluation of the requested media content.

8. The method of claim 1, wherein the advertising content includes a trivia game application and managing the spatial presentation includes positioning the pop-up window containing the trivia game application in proximity to the display window of the media player, wherein interaction with the trivia game application includes selecting answers to displayed questions.

9. The method of claim 8, wherein interaction with the trivia game application includes receiving input based on a user action.

10. The method of claim 8, wherein subject matter of the questions corresponds to a characteristic of the requested media content.

11. The method of claim 8, further comprising providing a reward based on the selected answers.

12. A system for dynamic integration and non-linear presentation of advertising content and media content, the system comprising:
   a server computing device configured to:
   receive a request for media content from a remote computing device;
   combine the requested media content and advertising content to provide an interactive advertising unit, wherein the interactive advertising unit comprises:
   a first content layer including the requested media content and a media player;
   a second content layer including the advertising content; and
   an integration module for coordinating interaction between the first and second content layers, wherein the coordinating includes one or more of:
   managing the spatial presentation of the requested media content and the advertising content;
   synchronizing the temporal presentation of the requested media content and the advertising content, including displaying the advertising content in a pop-up window (i) at one or more predetermined intervals or (ii) in response to user input during playback of the media content; and
   controlling the presentation priority of the requested media content and the advertising content; and
   transmit the interactive advertising unit for presentation on the remote computing device, wherein the advertising content and the requested media content are presented concurrently.

13. A computer program product, tangibly embodied in a non-transitory computer readable storage medium, dynamic integration and non-linear presentation of advertising content and media content, the computer program product including instructions operable to configure a data processing apparatus to:

receive a request for media content from a remote computing device;
combine the requested media content and advertising content to provide an interactive advertising unit, wherein the interactive advertising unit comprises:
a first content layer including the requested media content and a media player;
a second content layer including the advertising content; and
an integration module for coordinating interaction between the first and second content layers, wherein the coordinating includes one or more of:
managing the spatial presentation of the requested media content and the advertising content;
synchronizing the temporal presentation of the requested media content and the advertising content, including displaying the advertising content in a pop-up window (i) at one or more predetermined intervals or (ii) in response to user input during playback of the media content; and
controlling the presentation priority of the requested media content and the advertising content; and
transmit the interactive advertising unit for presentation on the remote computing device, wherein the advertising content and the requested media content are presented concurrently.

14. A method for dynamic integration and non-linear presentation of advertising content and media content, the method comprising:
receiving, by a server computing device, a request for media content from a remote computing device;
combining, by the server computing device, the requested media content and advertising content to provide an interactive advertising unit, wherein the interactive advertising unit comprises:
a first content layer including the requested media content and a media player;
a second content layer including the advertising content, wherein the advertising content includes one or more product icons; and
an integration module for coordinating interaction between the first and second content layers, wherein the coordinating includes one or more of:
managing the spatial presentation of the requested media content and the advertising content, wherein managing the spatial presentation includes positioning the one or more product icons to align with a scrubber bar of the media player;
synchronizing the temporal presentation of the requested media content and the advertising content; and
controlling the presentation priority of the requested media content and the advertising content; and
transmitting, by the server computing device, the interactive advertising unit for presentation on the remote computing device, wherein the advertising content and the requested media content are presented concurrently and interaction with the product icons displays an advertisement in the interactive advertising unit.

15. The method of claim 14, wherein interaction with the product icons includes receiving input based on a user action.

16. The method of claim 14, wherein synchronizing the temporal presentation includes displaying a pop-up window at a specified point during playback of the requested media content that coincides with the position of one of the product icons aligned with the scrubber bar.

* * * * *